United States Patent
Baker

[11] 3,762,801
[45] Oct. 2, 1973

[54] COMPACT THREE COMPONENT OBJECTIVE LENSES

[75] Inventor: James G. Baker, Winchester, Mass.

[73] Assignee: Polaroid Corporation, Cambridge, Mass.

[22] Filed: Feb. 24, 1972

[21] Appl. No.: 229,135

Related U.S. Application Data

[63] Substitute for Ser. No. 53,042, July 8, 1970, abandoned.

[52] U.S. Cl............ 350/189, 350/176, 350/225, 350/226, 350/255
[51] Int. Cl............ G02b 3/04, G02b 9/16
[58] Field of Search........... 350/189, 225, 226, 350/228, 229, 176

[56] References Cited
UNITED STATES PATENTS

| | | | |
|---|---|---|---|
| 1,485,929 | 3/1924 | Holst | 350/226 |
| 1,616,765 | 2/1927 | Sonnefeld | 350/189 |
| 1,658,365 | 2/1928 | Altman | 350/226 |
| 2,332,930 | 10/1943 | Rinia | 350/226 X |
| 2,417,942 | 3/1947 | Miles | 350/226 X |
| 3,486,805 | 12/1969 | Kobayashi | 350/2 |

FOREIGN PATENTS OR APPLICATIONS

| | | | |
|---|---|---|---|
| 7,661 | 3/1906 | Great Britain | 350/226 |
| 18,073 | 8/1906 | Great Britain | 350/225 |

*Primary Examiner*—John K. Corbin
*Attorney*—Frederick H. Brustman et al.

[57] ABSTRACT

Compact air-spaced three component photographic objective lenses with overall lengths less than one-eighth their nominal focal length are shown. Chromatic and spherical aberrations, astigmatism, field curvature, and distortion are corrected. The Petzval sum does not exceed 0.300, and the total relative refractivity exceeds 35 percent of the central element's refractivity. In certain species, focusing is accomplished by axially displacing the first component.

34 Claims, 4 Drawing Figures

| F = 1,000 | | L.O.A. = 0.0729 | P = 0.028 | f/8.6 |
|---|---|---|---|---|
| LENS | $n_d$ | $v_d$ | RADII | THICKNESSES |
| I | 1.519 | 44.4 | $R_1$= 0.2635<br>$R_2$=-6.7715 | $t_1$ =0.0080<br>$s_1$ =0.0169 |
| II | 1.678 | 55.2 | $R_3$ = 0.1890 *<br>$R_4$ =-0.2386* | $t_2$ =0.0329<br>$s_2$ =0.0071 |
| III | 1.519 | 44.4 | $R_5$=-0.5510<br>$R_6$= 0.1775 | $t_3$ =0.0080<br>$s_3$ =1.0624 |

* VERTEX RADIUS OF ASPHERIC CURVATURE

FIG. 4

COMPACT THREE COMPONENT OBJECTIVE LENSES

This is a continuation-in-part and replacement of my copending application Ser. No. 53,042, filed July 8, 1970, now abandoned.

BACKGROUND OF THE INVENTION

Three component lens systems have long been known. Frequently, though not always, they comprise outer positive components and an inner negative component. Visual telescopes may have been one of the first applications for such designs. That use is of interest here because those three component lenses sometimes exhibit barrel lengths which are short with respect to their focal lengths. They have no photographic applications due to their relatively small apertures and strong image field curvatures. Their Petzval sum, $P$, a measure of field curvature, is generally about 1.0, and greater.

Development of well corrected three element lenses for photography is attributed to H. D. Taylor. His proposals, made before the turn of the century, led to a family of lenses known as Cooke Triplets. Modern derivatives of his original proposals contain as many as seven elements. Taylor's original proposal was quite useful because a triplet contains just enough degrees of freedom to achieve a desired focal length and correct important aberrations. Varying the lens powers and air spacings of three elements establishes a particular focal length and corrects for longitudinal chromatic aberration, lateral color, and field curvature. Field curvature is expressed herein as the Petzval sum, $P$. It is the sum of individual lens power, each divided by its respective refractive index:

$$P = \phi_I/n_I + \phi_{II}/n_{II} + \phi_{III}/n_{III}$$

Shaping or bending individual lenses can be used to correct spherical aberration, coma, and astigmatism. Distortion is corrected by subsequently manipulating lens powers and their shapes. It is necessary, in designing for aberration corrections, to make initial assumptions which are evaulated and perhaps changed in the light of results. In this manner, an appropriate lens design for a long barreled triplet can be quickly converged upon.

The principal variables available to a designer of a triplet objective are six surface curvatures, three refractive indices, three Abbe $\nu$ values, and two air spaces.

Previous photographic triplets are characterized by relatively cumbersome size. Designers, in obtaining a flat field by reducing Petzval sum, P, made air spaces between elements quite large in order to retain useful power in the triplet. Compactness, e.g., overall length, has not usually been a consideration. Cooke triplets are characterized by a barrel length of at least one-fourth and even up to one-half of their focal lengths. Length, until now, was an inconsequential result of other considerations.

Earlier triplets have gross dimensions if field curvature is photographically useful or photographically unacceptable field curvatures if they happen to be compact.

Modern photographic equipment is made compact for convenience in handling, transportation, and storage. Each part of a modern camera should be made as compact as possible if the whole is to have a minimum size. This is particularly so in cameras which fold to a more compact form for carrying and storage. Lens size represents a boundary on the ultimate reduction in size for a folding camera. Copending U. S. Patent Application, Ser. No. 774,141, now U. S. Pat. No. 3,619,036, filed Nov. 7, 1968 in the name of the present Applicant and assigned in common, discloses a new family of extremely compact, well corrected, four element photographic objectives particularly useful in folding cameras.

Disclosed herein are even smaller three component photographic objectives. Photographic triplets designed according to teachings herein have an overall length only a fraction of that previously known.

Design of useful photographic objectives requires consideration and correction of many different aberrations inherent in optical lens systems. Aberrations which the optical designer must deal with include lateral and longitudinal chromatic aberrations, spherical aberrations, coma, astigmatism, field curvature, and distortion. Widespread use of color film makes correction of chromatic aberrations particularly important in modern photographic objectives. In treating these aberrations and designing a photographic objective, with respect to other considerations, for example size and cost, the designer must deal with results from many simultaneous solutions to many non-linear equations, closely related mathematically, even if they must be treated in segments. Several aberrations and their effect on designing a compact well corrected photographic objective are considered below.

Chromatic aberrations of an optical system are of two distinct types, i.e., longitudinal and lateral.

Longidudinal chromatic aberration is due to refractive index dependence on color. In consequence, there is a different image location along the axis for each color of light. Lateral chromatic aberration designates the formation of color images of different sizes because magnification depends on color. Lateral chromatism can remain in a lens which is corrected for longitudinal chromatism.

Corrections for longitudinal and lateral chromatic aberrations are achieved in two different manners. A classical correction for longitudinal chromatic aberration contributed by a single element is substitution therefor of two closely spaced, typically contacting, optical elements. The pair, generally known as an achromatic doublet, is constructed from two different glasses. For example, a large Abbe $\nu$ value is used in a positive doublet's stronger or convergent element. Glass having a lower Abbe $\nu$ value is used in the weaker or divergent element. In the past, the stronger or convergent element typically had the lower refractive index. In more recent practice, a wider choice of refractive indices prevails and selection is according to other requirements. Shapes for respective elements can be determined through the use of known formulas. A pair of lenses result which, in combination, tend to cancel esch other's color dispersion. They have a net optical power other than zero. This result is achieved because relatively large differences in dispersion, Abbe $\nu$ value, are employed. The achromatic doublet described, composed of a closely spaced contacting pair of elements, is also substantially corrected for lateral chromatism.

This is because very thin lenses in contact have their principal planes for light wavelengths lying close together. Focal lengths for these wavelengths are approximately the same. Image magnification for each wavelength of light is approximately equal with all color images in the common image plane attained by prior correction for longitudinal chromatism. Lateral chromatic aberration is minimized.

The approximate correction for lateral chromatism inherent in a thin achromatic doublet is not present with thick lens elements or lens elements not nearly in contact with each other. A thick, or air spaced, doublet then suffers from lateral chromatism even though corrected for longitudinal chromatism. Thick lenses and lenses physically separated from each other do not have their principal planes for light wavelengths lying close together. Thus, while images formed at several wavelengths may have a common image plane whereby longitudinal chromatic aberration lengths corrected, focal engths at each of several wavelengths are different, resulting in a different size image for different wavelengths even though the images lie in a common plane. Therefore, an air-spaced doublet cannot be corrected simultaneously for longitudinal and lateral chromatic aberrations unless further compounded.

If longitudinal chromatism is ignored, lateral chromatism can be eliminated in a fairly simple manner by using two lens elements which can be made from the same optical material. This correction for lateral chromatic aberration is achieved by using an air space between two lenses which is equal to one-half the sum of their focal lengths. This correction for lateral chromatic aberration yields the same image magnification for each light wavelength, but the images lie in different planes. It should be understood that this correction for lateral chromatic aberration introduces strong longitudinal chromatic aberration. It is an unsatisfactory solution by itself for use in photographic objectives which are required to bring images of several colors into focus at a common plane where photosensitive material can be located. In the above solution for lateral chromatic aberration, it is to be appreciated that forming a reasonably sized objective lens with useful power requires two spaced-apart elements having assigned powers.

It has been common practice to reduce or eliminate lateral chromatic aberration by combining elements into similar but opposed groupings in either side of the central stop. In this way, prismatic dispersions of the chief rays can be made more or less equal in magnitude, but opposite in algebraic sign for the two groupings. The system as a whole then shows little or no final dispersion of the chief rays at the image plane even though in either grouping, separately, a very large dispersion of the chief rays exists. Then, also, in the prior art it has been the practice to correct each group separately for longitudinal chromatic aberration, which then remains corrected for the system when two groupings are combined. A combination of two elements for each grouping on either side of a central stop or plane of symmetry permitted a designer to employ thick lens elements, large air spaces, or both, to achieve simultaneous corrections for longitudinal and lateral chromatic aberrations and certain monochromatic aberrations.

Image field curvature is proportional to the Petzval sum. For a centered optical system it is given by the expression $$P = \sum_i^N \left( \frac{1}{n_{i-1}} - \frac{1}{n_i} \right) \frac{1}{R_i}$$

where $R_i$ is the radius of curvature for the ith surface, $n_{i-1}$ is the index of refraction preceding the ith surface and $n_i$ the index of refraction following the ith surface. Petzval discovered that this sum precisely describes the field's third order curvature in the absence of astigmatism. Indeed, in that case the reciprocal of Petzval sum, which is the radius of the Petzval surface, is also the field's radius of curvature. If astigmatism is not zero, there are two actual image surfaces to consider, the sagittal surface, S, and the tangential surface, T, plus the Petzval surface. If the Petzval sum is positive, the lens system is said to be under-corrected and the Petzval surface curves toward the lens (negative curvature). If astigmatism is under-corrected, also, meaning the tangential image surface curves toward the lens more than the sagittal image surface, a positive Petzval sum indicates the Petzval surface is curved toward the lens, too, but less than either tangential or sagittal surfaces. Positive Petzval sum combined with over-corrected astigmatism results in lensward (leftward) curved Petzval surface and rightward curved tangential image surface. The sagittal image surface lies between the two substantially less curved than either. With P positive and zero astigmatism, the Petzval, P, sagittal, S, and tangential, T, curves all have the same radius and a common origin. In very compact lenses with which this invention is concerned, it is difficult to introduce negative (over-corrected) astigmatism to compensate for a large Petzval sum.

The preceding discussion concerned only what is actually the third order situation, involving Seidel optics. For a more precise treatment, or for optical systems with large field angles, fifth and higher order terms must be considered, changing the outer field quite appreciably. The fifth order contains, in principle, three Petzval sums, P, which are much more complicated to compute than the standard Petzval sum. Higher order astigmatism behaves in about the same way, in principle, as third order astigmatism, but in the ratio of 5:1, 7:1, etc. Because of the increased number of parameters, the P, S, and T curves in the outer field can vary in a number of ways, sometimes curving forward and sometimes backward, even for a state of under-correction in the third order. Petzval surface is discussed in greater detail by Rudolph Kingslake in *Handbook of Photography* (Henney and Dudley, editors, 1939).

From a design point of view, the Petzval Sum is a sensitive condition numerically, large design changes being required to affect comparatively small changes in field curvature. Petzval sum is independent of thicknesses and separations, whereas the net optical power of a system depends on both, as well as on curvatures. Therefore, it is possible to achieve useful net lens power with a small Petzval sum by having fairly large thicknesses and separations. Conversely, if a system must be thin, it is extremely difficult to achieve a low Petzval sum. Consequently, it has been accepted until my recent work with unusually compact four element photographic lenses, that combining useful net lens power with acceptable field flatness required very large air spaces. Compromises were usually made resulting in a triplet lens having, in different measures, an overall length representing a large fraction of its focal length and residual field curvatures as well. By using substantially higher indices for the positive elements, relative to those for the negative elements, I have invented a genus of photographic triplets which are very short and have desirably flat fields. Chromatic aberrations can still be corrected by choosing glasses properly and using approximate symmetry in the photographic triplet lens.

The sizeable overall length of triplet photographic objective lenses has previously been accepted. Length was considered an inconsequential result of correcting field curvature and chromatic aberrations. An artificial limitation arose on their compactness.

This invention, by contrast, considers overall length to be a variable quality which can be markedly reduced, achieving an intentionally compact, well corrected, triplet photographic objective lens.

BRIEF SUMMARY OF THE INVENTION

Among the principal objects of this invention are to provide:
a very compact photographic objective lens;
one which is well corrected for longitudinal and lateral chromatic aberrations;
one having a suitably flat field, represented by a Petzval sum, P, less than 0.300;
one which is corrected for spherical aberration, coma, astigmatism, and distortion;
a lens whose overall length does not exceed one-eighth its nominal focal length;
a lens having a useful image area with a diameter approximately equal to its focal length; and
a lens focused by adjusting the first element and having a constant back focal distance and which remains appropriately corrected for a range of object distances from two times its focal length to infinity.

These and other objects of the invention are preferably accomplished by a compact three component lens system having a divergent lens between two convergent lenses. Relatively high power is obtained in the first component by using large refractive index and an appropriately curved first surface. A large refractive index is also used in the positive third element with a low refractive index chosen for the negative middle element. Large differences in refractivity between consecutive positive and negative lens components are an important feature of objective lenses according to the inventive concepts described herein. A pertinent relation, the total relative refractivity ratio, between the refractivities of consecutive components may be concisely stated using the following expression:

$$|(n_1-n_2) + (n_3-n_2)|/(n_2-1) \geq 0.35.$$

Large Abbe values, $v$, are selected for first and third lenses. The first element has an Abbe value at least 20 percent greater than that for the middle element.

By maintaining the first lens' reciprocal dispersive power or Abbe value at least to 20 percent greater than the value selected for the second element and using comparatively large refractive indices and Abbe values in first and third lenses, it is possible to construct a compact, well corrected, photographic triplet lens having an overall length not exceeding one-eighth its nominal focal length with a relatively flat field, P being less than 0.300. Effective reciprocal dispersive power may be related to a component's ability to affect chromatic aberrations. It can be considered an effective Abbe value for compound lens elements. Increasing reciprocal dispersive power, as increasing Abbe value, indicates less color dispersion. Abbe value as used hereafter is meant to include the reciprocal dispersive power of a multi-element component.

Other objects of the invention will in part be obvious and will in part appear hereinafter.

The invention accordingly comprises the photographic lens possessing the features, properties, and relation of components which are exemplified in the following detailed disclosure and the scope of the application of which will be indicated in the claims.

DESCRIPTION OF THE DRAWING

For a fuller understanding of the nature and objects of the invention, reference should be had to the following detailed description taken in connection with the accompanying drawing wherein.

DETAILED DESCRIPTION

Figure 1:
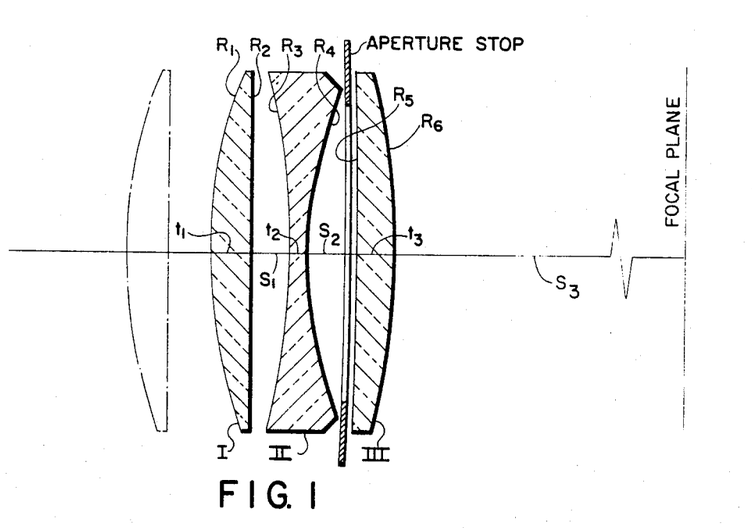
FIG. 1 illustrates a cross-section of a compact, well corrected, photographic objective according to the invention in which focusing is accomplished by adjustment of the front element.

Reference should be had to FIG. 1. FIG. 1 illustrates a very compact three element photographic objective lens. Lens elements I through III are numbered in order from the long conjugate or front side of the triplet to the short conjugate or rear side of the lens. Lens element I is illustrated in the position for which the compact photographic objective is focused at infinity. Broken lines represent its position when the triplet is focused on an object approximately two times its focal length away. Axial lens thicknesses are designated t and axial air spaces between elements are designated s. Individual lens surfaces are designated R. The aperture stop is shown between elements II and III.

Elements I and III are convergent. Element II is divergent. Certain examples of the invention, presented below, are focused by moving only element I to change the lens' nominal focal length instead of axial unitary movement of the entire lens. In those examples element I is moved forward, illustrated by broken lines in FIG. 1, changing the compact triplet's nominal focal length, but retaining the image plane substantially the same distance from the aperture stop. Embodiments of the invention using axial movement of element I to accomplish focusing preferably have relatively high power front elements. Incorporating strong power into element I minimizes its displacement over the full focal range. Minimizing the moving element's I displacement reduces the degree to which optical aberration corrections are upset during focusing. The triplet's aperture stop is located between elements II and III. Improved aberration control throughout the full range focusing is obtained due to relative proximity between element I and the aperture stop. Concave surfaces $R_3$, $R_4$ of element II have aspheric configurations.

Air space $s_1$ forms a positive lens between elements I and II. Its thickness increases in certain examples as the front element is adjusted to focus the compact triplet lens on nearby objects. Air space $s_2$ forms a positive air lens between elements II and III. Air space $s_2$ remains constant.

Lens element I is shown as a plano-convex element. It should have a relatively high power, preferably greater than three times the compact triplet's power if front element focusing is used, as it is with the illustrated lens specie. This can be achieved using a strongly curved first surface $R_1$ and a large refractive index. With a very large refractive index, curvature of surface of $R_1$ can be relatively weak, thereby reducing its aberrant contributions. The second surface, $R_2$, should be weak, having little or no curvature. Surfaces $R_3$ and $R_4$ have relatively strong curvatures. In the embodiment illustrated in FIG. 1 and examples set forth below, one or both of surfaces $R_3$ and $R_4$ is aspheric. Surface $R_5$ has a weak curvature and is nearly planar in all embodiments. Surface $R_6$ on element III is strongly curved.

The unusual compactness of the triplet photographic objective lens shown in FIG. 1 permits construction of a very compact folded photographic camera. Embodiments employing front element focusing have a substantially constant back focal distance. This yields a photographic camera having substantially the same angular field for all object distances. Focusing mechanisms can be simplified. Only one lens element has to be moved. Substantially less displacement is required than if the entire objective were moved for focusing. Fixed lens elements simplify use of a between-the-lens shutter if one is required.

Figure 2:
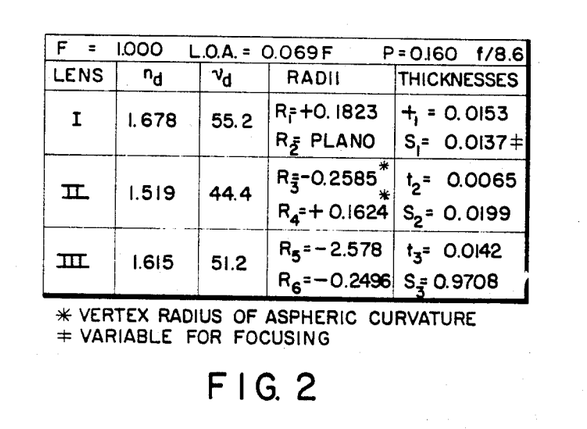
FIG. 2 is a tabulation of constructional data, based on unit focal length, for the compact triplet lens illustrated in FIG. 1.
Figure 3:
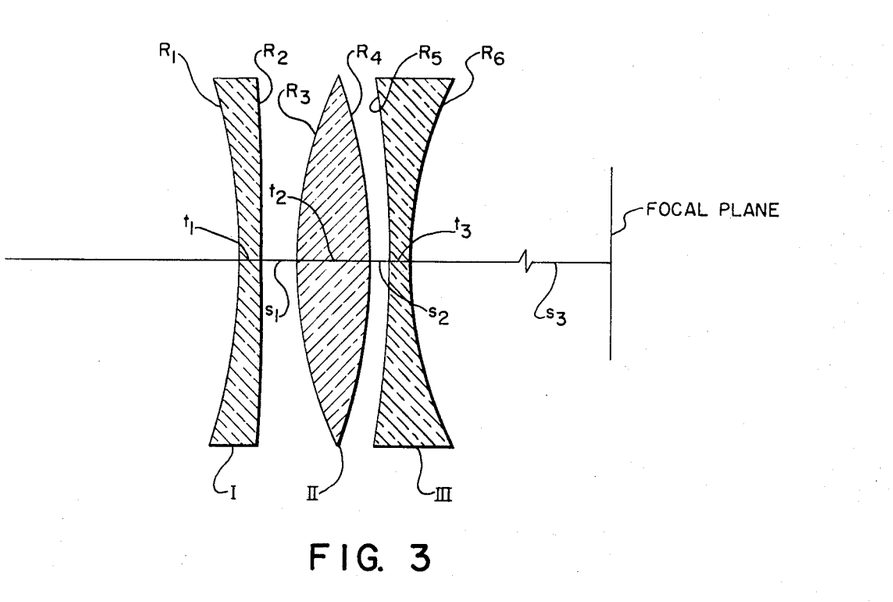
FIG. 3 illustrates another specie of a compact objective lens according to the invention.
Figure 4:
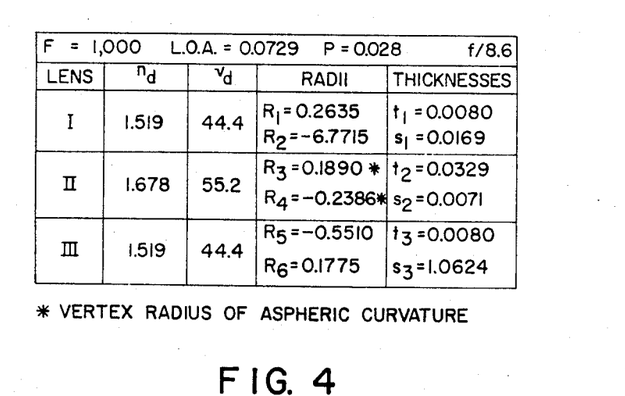
FIG. 4 tabulates constructional data for the compact objective illustrated in FIG. 3.

Constructional data for the extremely compact, front element focusing triplet lens illustrated in FIG. 1 is tabulated in FIG. 2. It is in terms of Unit Focal Length. Overall length of the compact triplet from entrance surface, $R_1$, to exit surface, $R_6$, is less than 7 percent of its nominal focal length. Field curvature, denoted by Petzval sum, P, is quite small being only 0.160. In fact, field curvature of this design is considerably better than that associated with older, bulky, triplets. Refractive index, $n_d$, and Abbe value, $\nu_d$, are given for the helium $d$ spectral line, 587.6 nanometers. It should be noted that $s_1$ is variable for focusing purposes. In the tabulation of FIG. 2, $s_1$ is for an object approximately 9.7 focal lengths away. Numerical values given for surfaces $R_3$ and $R_4$ represent the vertex radii of the aspheric surfaces actually intended.

Moving the front element changes a lens' focal length. The nominal focal length, for the purpose of this description, of embodiments utilizing front element focusing is measured with the compact photographic triplet lens focused on an object at infinity.

The compact triplet of FIGS. 1 and 2 has a useful image area with a diameter approximately equal to its focal length. By useful image area is meant that region over which the lens forms, on typical photographic film, an image which yields a pleasing photographic record of the subject. The curvature of the focal surface, as expressed by the Petzval sum, must not deviate too far from flatness if acceptable image quality is to be retained. All the examples tabulated below have useful field diameters approximately equal to their focal length. This is a normal criteria for common general purpose camera lenses.

Specific embodiments of compact triplet photographic objective lenses constructed in accordance with the principles of this invention are given by illustrative examples A through H, J, and K set forth below. It should be understood that for any particular application of the invention, a preferred region of the spectrum may be used in the design. For consistency herein, refractive index, $n$, and Abbe value, $\nu$, are specified for the yellow helium d spectral line, 587.6 nanometers. Petzval sum, P, is calculated for the blue hydrogen F spectral line, 486.1 nanometers.

EXAMPLE A

| $F = 1.000$ | | L.O.A. $= 0.0696$ | | $P = 0.160$ | f/8.6 |
|---|---|---|---|---|---|
| LENS | $n_d$ | $\nu_d$ | Radii | | Thicknesses |
| I | 1.678 | 55.2 | $R_1 = 0.1823$ | | $t_1 = 0.0153$ |
| | | | $R_2 = $ plano | | $s_1 = 0.0137$ |
| II | 1.519 | 44.4 | $R_3 = -0.2585*$ | | $t_2 = 0.0065$ |
| | | | $R_4 = 0.1624*$ | | $s_2 = 0.0199$ |
| III | 1.615 | 51.2 | $R_5 = -2.578$ | | $t_3 = 0.0142$ |
| | | | $R_6 = -0.2496$ | | $s_3 = 0.9708$ |
| * Aspheric: | | $\beta_3 = 20.150$ | | $\gamma_3 = 766.4$ | |
| | | $\beta_4 = -20.833$ | | $\gamma_4 = 929.8$ | |

$$|(n_1-n_2) + (n_3-n_2)| / (n_2-1) = 0.49$$

Example A is the same constructional data tabulated in FIG. 2 for the species of the compact triplet photographic lens illustrated in FIG. 1. Particularly important is the short length overall, L.O.A., which is less than 7 percent of its focal length. Field curvature measured by Petzval sum, P, is only 0.160. This example employs front element focusing; therefore, $s_1$ is variable. The dimension given is for an object 9.7 focal lengths distant. Back focal length $s_3$ remains constant while $s_1$ changes for focusing. Surfaces $R_3$ and $R_4$ have aspheric curvatures. Numerical values are given for the vertex radii of the respective surfaces. A polynomial equation describing aspheric curvatures is set out and discussed below. Coefficients for use in the polynomial equation describing aspheric surfaces $R_3$ and $R_4$ are listed, too. Subscripts indicate which surface the particular coefficient pertains to. Example A is fully optimized for use over an extended focal range varying from 3F to infinity.

EXAMPLE B

| $F = 1.000$ | | L.O.A. $= 0.0614$ | | $P = 0.188$ | f/8.6 |
|---|---|---|---|---|---|
| LENS | $n_d$ | $\nu_d$ | Radii | | Thicknesses |
| I | 1.678 | 55.2 | $R_1 = 0.1915$ | | $t_1 = 0.0141$ |
| | | | $R_2 = -7.632$ | | $s_1 = 0.0106$ |
| II | 1.519 | 44.4 | $R_3 = -0.2189*$ | | $t_2 = 0.0067$ |
| | | | $R_4 = 0.1795*$ | | $s_2 = 0.0168$ |
| III | 1.611 | 55.9 | $R_5 = -1.0021$ | | $t_3 = 0.0132$ |
| | | | $R_6 = -0.2021$ | | $s_3 = 0.9946$ |
| * Aspheric: | | $\beta_3 = 20.227$ | | $\gamma_3 = 670.7$ | |
| | | $\beta_4 = -22.134$ | | $\gamma_4 = 498.2$ | |

$$|(n_1-n_2) + (n_3-n_2)| / (n_2-1) = 0.48$$

Example B has an overall length between first and last surfaces, only slightly greater than 6 percent of its focal length. Its Petzval sum, P, is 0.188. A lens constructed from Example B can focus by displacing the lens element I. Air space $s_1$ is variable, the dimension is for an object 9.8 focal lengths distant. Back focal length $s_3$ is constant. Back focal length refers to the axial distance between last surface $R_6$ and the actual image plane. Surfaces $R_3$ and $R_4$ are both aspheric. Their respective coefficients are tabulated above.

EXAMPLE C

| $F = 1.000$ | | L.O.A. $= 0.120$ | | $P = 0.160$ | f/8.6 |
|---|---|---|---|---|---|
| LENS | $n_d$ | $\nu_d$ | Radii | | Thicknesses |
| I | 1.836 | 42.3 | $R_1 = 0.2568$ | | $t_1 = 0.0200$ |
| | | | $R_2 = 0.6078$ | | $s_1 = 0.0341$ |
| II | 1.617 | 31.0 | $R_3 = -0.5648*$ | | $t_2 = 0.0100$ |

| III | 1.836 | 42.3 | $R_4 = 0.2938$ | $s_2 = 0.0359$ |
|-----|-------|------|----------------|----------------|
|     |       |      | $R_5 = -14.63$ | $t_3 = 0.0200$ |
|     |       |      | $R_6 = -0.3959$ | $s_3 = 0.937$ |

* Aspheric: $\beta_3 = 3.590$ $|(n_1-n_2) + (n_3-n_2)|/(n_2-1) = 0.71$

Example C has an overall length slightly less than one-eighth its focal length. Its Petzval sum, P, is 0.160. It is not designed for front element focusing. Only one aspheric surface $R_3$ is used. Its vertex radius and aspheric coefficient are recorded above. Note use of the same very high refractive index and medium-to-low Abbe value in both lenses I and III, also the comparatively strong curvature of $R_2$. The medium-to-low Abbe values and comparatively strong curvature at $R_2$ are feasible because $s_1$ is fixed. Corrections for residual aberrations are not upset by lens displacement for focusing.

EXAMPLE D

F = 1.000  L.O.A. = 0.120  P = 0.160  f/8.6

| LENS | $n_d$ | $\nu_d$ | Radii | Thicknesses |
|------|-------|---------|-------|-------------|
| I    | 1.729 | 54.2    | $R_1 = 0.2538$ | $t_1 = 0.0200$ |
|      |       |         | $R_2 = 2.430$  | $s_1 = 0.0302$ |
| II   | 1.596 | 39.2    | $R_3 = -0.3871$* | $t_2 = 0.0100$ |
|      |       |         | $R_4 = 0.2555$ | $s_2 = 0.0398$ |
| III  | 1.788 | 50.5    | $R_5 = -2.283$ | $t_3 = 0.0200$ |
|      |       |         | $R_6 = -0.3395$ | $s_3 = 0.9276$ |

* Aspheric: $\beta_3 = 10.323$ $|(n_1-n_2) + (n_3-n_2)|/(n_2-1) = 0.55$

Example D has an overall length slightly less than one-eighth its focal length. Its Petzval sum, P, is 0.160. Front element focusing is not used in Example D; therefore, air space $s_1$ is constant. Surface $R_3$ is aspheric. Its vertex radius and aspheric coefficient are tabulated. In this example, refractive index is highest in rear lens element III.

EXAMPLE E

F = 1.000  L.O.A. = 0.120  P = 0.160  f/8.6

| LENS | $n_d$ | $\nu_d$ | Radii | Thicknesses |
|------|-------|---------|-------|-------------|
| I    | 1.802 | 44.3    | $R_1 = 0.2583$ | $t_1 = 0.0200$ |
|      |       |         | $R_2 = 0.5146$ | $s_1 = 0.0420$ |
| II   | 1.617 | 31.0    | $R_3 = -0.4750$* | $t_2 = 0.0100$ |
|      |       |         | $R_4 = 0.3389$ | $s_2 = 0.0280$ |
| III  | 1.881 | 41.0    | $R_5 = 21.42$  | $t_3 = 0.0200$ |
|      |       |         | $R_6 = -0.3848$ | $s_3 = 0.9412$ |

* Aspheric: $\beta_3 = 2.512$ $|(n_1-n_2) + (n_3-n_2)|/(n_2-1) = 0.73$

Example E has an overall length less than one-eighth its focal length. Petzval sum, P, is 0.160. It is not intended for front element focusing. Surface $R_3$ is aspheric. Both vertex radius and aspheric coefficient are tabulated. Surface $R_2$ has a comparatively strong curvature. An unvarying air space $s_1$ permits using medium-to-low Abbe values. Very high refractive indices can thereby be used in lenses I and III. Lens III has the highest refractive index, $n_d = 1.881$. The aspheric curve on surface $R_3$ is very weak. This compact triplet lens is quite close to being an all-spherical design.

EXAMPLE F

R = 1.000  L.O.A. = 0.089  P = 0.140  f/8.6

| LENS | $n_d$ | $\nu_d$ | Radii | Thicknesses |
|------|-------|---------|-------|-------------|
| I    | 1.613 | 57.4    | $R_1 = 0.1775$ | $t_1 = 0.0213$ |
|      |       |         | $R_2 = 2.027$  | $s_1 = 0.0139$ |
| II   | 1.519 | 44.4    | $R_3 = -0.2928$* | $t_2 = 0.0091$ |
|      |       |         | $R_4 = 0.1605$* | $s_2 = 0.0264$ |
| III  | 1.697 | 56.2    | $R_5 = 1.490$  | $t_3 = 0.0183$ |
|      |       |         | $R_6 = -0.3379$ | $s_3 = 0.9619$ |

* Aspheric: $\beta_3 = 23.444$   $\gamma_3 = 600.4$ $\beta_4 = -14.178$   $\gamma_4 = 556.7$ $|(n_1-n_2) + (n_3-n_2)|/(n_2-1) = 0.52$ Example F has a length overall less than nine percent of its focal length. Its Petzval sum, P, is 0.140. This represents an unusually small amount of field curvature for a three-element photographic objective lens. The compact triplet lens represented by Example F is front element focusing; therefore, air space $s_1$ is variable. The tabulated dimension is for an object 25.4 focal lengths distant. Back focal length $s_3$ is constant. Surfaces $R_3$ and $R_4$ have aspheric curvatures. Numbers tabulated for them are the aspheric curves' vertex radii. Coefficients necessary to describe the aspheric curves are tabulated, too.

EXAMPLE G

F = 1.000  L.O.A. = 0.0729  P = 0.028  f/8.6

| LENS | $n_d$ | $\nu_d$ | Radii | Thicknesses |
|------|-------|---------|-------|-------------|
| I    | 1.519 | 44.4    | $R_1 = -0.2635$ | $t_1 = 0.0080$ |
|      |       |         | $R_2 = -6.7715$ | $s_1 = 0.0169$ |
| II   | 1.678 | 55.2    | $R_3 = 0.1890$* | $t_2 = 0.0329$ |
|      |       |         | $R_4 = -0.2386$* | $s_2 = 0.0071$ |
| III  | 1.519 | 44.4    | $R_5 = -0.5510$ | $t_3 = 0.0080$ |
|      |       |         | $R_6 = 0.1775$ | $s_3 = 1.0624$ |

* Aspheric: $\beta_3 = -29.705$
$\beta_4 = 24.034$ $|(n_1-n_2) + (n_3-n_2)|/(n_2-1) = 0.47$ Example G is included to show that the principles of this invention are applicable to triplet lenses having other power arrangements besides plus, minus, plus. It is not an optimum lens but demonstrates the principles of the invention. Note that Petzval sum, P, is less than 0.300 and overall length does not exceed one-eighth the nominal focal length. Third order aberrations are balanced against higher order aberrations to improve the outer field. While performing well enough at f/11 with a 40° field, the image becomes soft in the corners at f/8.6 with a 48° field. Front element focusing is not intended.

EXAMPLE H

F = 1.000  L.O.A. = 0.0683  P = 0.163  f/8.6

| LENS | $n_d$ | $\nu_d$ | Radii | Thicknesses |
|------|-------|---------|-------|-------------|
| I    | 1.678 | 55.2    | $R_1 = 0.1828$ | $t_1 = 0.0153$ |
|      |       |         | $R_2 = $ plano | $s_1 = 0.0133$ |
| II   | 1.519 | 44.4    | $R_3 = -0.2549$* | $t_2 = 0.0065$ |
|      |       |         | $R_4 = 0.1634$* | $s_2 = 0.0189$ |
| III  | 1.615 | 51.2    | $R_5 = -2.249$ | $t_3 = 0.0143$ |
|      |       |         | $R_6 = -0.2440$ | $s_3 = 0.9731$ |

* Aspheric: $\beta_3 = 20.2299$   $\gamma_3 = 757.4$
$\beta_4 = -21.0009$   $\gamma_4 = 918.9$ $|(n_1-n_2) + (n_3-n_2)|/(n_2-1) = 0.49$ Example H has a very weak field curvature, P = 0.163. It is intended to focus by front lens element, I, displacement. Its length overall when focused on an object 9.7 focal lengths distant is less than 7 percent of its nominal focal length. Refocused at infinity, its length overall is still smaller. It should be noted that length overall given for other front element focusing examples, A, B, F, is for air space $s_1$ as tabulated; examples A, B, F, are shorter refocused for infinity. Air space $s_1$ is variable. The dimension given focuses a 9.7 focal lengths distant object. Back focal length $s_3$ is constant. Surfaces $R_3$ and $R_4$ are both aspheric. Their respective coefficients are tabulated above. It is from this example that the fully optimized extended focusing range triplet of Example A is derived.

EXAMPLE J

| F = 1.000 | L.O.A. = 0.1149 | | P = 0.066 | f/6.3 |
|---|---|---|---|---|
| LENS | $n_d$ | $v_d$ | Radii | Thicknesses |
| I | 2.4176 | 55.9 | $R_1 = 0.2467$ | $t_1 = 0.0137$ |
| | | | $R_2 = 0.3277$ | $s_1 = 0.0369$ |
| II | 1.9212 | 35.7 | $R_3 = 15.22*$ | $t_2 = 0.0077$ |
| | | | $R_4 = 0.4119*$ | $s_2 = 0.0449$ |
| III | 2.4176 | 55.9 | $R_5 = -0.8651$ | $t_3 = 0.0117$ |
| | | | $R_6 = -0.4530$ | $s_3 = 0.9308$ |

\* Aspheric: $\beta_3 = -2.7011$
$\beta_4 = 1.2359$ $$|(n_1-n_2) + (n_3-n_2)|/(n_2-1) = 1.08$$

Example J represents unusual choices for materials, but it nevertheless demonstrates the principles of the invention. Elements I and III have very high refractive indices, and Element II has a high refractive index. Its field is quite flat, P being only 0.066 for f/6.3 and a 48° field of view. Surfaces $R_3$ and $R_4$ are aspheric but only $\beta$ coefficients are required. The material for lenses I and III is diamond. The glass for lens II is LaSF-7 which strongly absorbs light. A more transparent optically similar material is available. It is a sintered crystalline fused mixture of yttrium and thorium oxides sold under the tradename of Yttralox by the General Electric Company, Schenectady, New York. Front element focusing is not intended.

EXAMPLE K

| F = 1.000 | L.O.A. = 0.1214 | | P = 0.276 | f/8.0 |
|---|---|---|---|---|
| LENS | $n_d$ | $v_d$ | Radii | Thicknesses |
| I | 1.641 | 60.1 | $R_1 = 0.2002$ | $t_1 = 0.0240$ |
| | | | $R_2 = 1.883$ | $s_1 = 0.0235$ |
| II | 1.519 | 44.4 | $R_3 = -0.5478*$ | $t_2 = 0.0075$ |
| | | | $R_4 = 0.1844*$ | $s_2 = 0.0484$ |
| III | 1.583 | 59.5 | $R_5 = 1.4240$ | $t_3 = 0.0180$ |
| | | | $R_6 = -0.4219$ | $s_3 = 0.9133$ |

\* Aspheric: $\beta_3 = 4.325$
$\beta_4 = -5.656$ $$|(n_1-n_2) + (n_3-n_2)|/(n_2-1) = 0.36$$

Example K illustrates an embodiment of the invention which represents the extremes of the useful limits of Petzval sum, overall length, and total relative refractivity ratio according to the present concepts. The total relative refractivity of Example K is the smallest of all the examples. It slightly exceeds 35 percent of the central element's refractivity. Note that the Petzval sum and the overall length are just within the limits that characterize triplet objectives according to the present invention. If the refractive indices are selected so the total relative refractivity ratio decreases to much less than 0.35, the flat field is sacrificed to maintain a short overall length, i.e., P will exceed 0.300. If instead the ratio decreases to less than 0.35 and a flat field is retained (P remains less than 0.300), the overall length increases to substantially more than one-eighth the focal length. Moreover, if both the flatness of field and the overall length are retained when the ratio decreases to less than 0.35, the lens surface curvatures become quite strong and the aberrations of the lens increase noticeably. The first air space, $s_1$, varies if front element focusing is used.

In a successful photographic objective for commercial use, an important consideration is the amount of curvature in its image field. The severity of this defect is commonly measured by Petzval sum, P. Petzval sum is dependent solely on refractive indices and surface curvatures selected for individual lens elements in the objective. Field curvature, represented by Petzval sum, should not ordinarily in a practical lens be made zero; a compromise between field flatness and amelioration of higher order aberrations must be accepted, otherwise complete correction of one is at an unacceptable cost to correction of others. A value of Petzval sum, P, of 0.300 is maximum for a lens of this genus when used in conjunction with commercial photosensitive materials which typically are flat.

In the invention embodied in the very compact triplet objective lens disclosed herein, selection of curvatures and refractive indices has made it possible to achieve a field flatness, measured by Petzval sum, P, superior to that of any other triplet photographic objective lens known to the art having a comparably short overall length. It has been discovered that corrections for several aberrations in compact triplet lenses benefit by having Abbe values of the first element, lens I, rather large compared to that of the second element, lens II. This is the case in all examples. The third surface of this compact triplet is one of strong refraction governing a good part of the chromatic spherical aberration and off-axis aberrations of the lower rim rays. It has, therefore, a strong tendency to cause too large an inward refraction of lower rim rays. This is corrected for, in part, by using aspheric curvatures on surfaces $R_3$ and $R_4$.

DISCUSSION OF THE RANGE OF VARIATION OF INDIVIDUAL PARAMETERS FOR SHORT BARREL TRIPLETS HAVING PLUS, MINUS, PLUS POWER DISTRIBUTION

In those examples discussed above where the first element is movable for focusing, air space $s_1$ reaches its minimum value when the lens is focused for infinity. In practice, there is necessarily a minimum value somewhat greater than zero to allow for mounting clearances and for the case of the adjacent surfaces $R_2$ and $R_3$, which form the first air space, being concave to one another. The maximum value of $s_1$ and therefore the shortest useful object distance is limited to the value of $s_1$ which causes chromatic aberrations to become excessive. When $s_1$ is a fixed dimension, it is selected to optimize corrections for chromatic aberrations at a preselected object distance.

The second air space, $s_2$, is also limited by physical considerations. Its minimum value occurs in plus, minus, plus power distributions when surfaces $R_4$ and $R_5$ touch one another at the specified clear aperture. For all moving front element systems and most fixed element systems, these surfaces are concave to one another. Requiring a compact final design sets the limit on the air space $s_2$. An upper bound of 0.04F on air space $s_2$ allows for the possible use of an iris diaphragm, shutter, or both therein. It also allows for some improvement where necessary in performance without increasing overall barrel length unduly.

Air space ranges for short barrel triplets depend on the residual allowance for lens thickness. To obtain a triplet lens having an overall length not exceeding one-eighth its nominal focal length, approximately 0.035F can be allotted to combined glass thickness. A total of 0.090F remains for the two air spaces. Either may lie in the range from 0.005F to 0.085F according to the construction and according to where the iris and shutter are to be placed.

The first surface, $R_1$, in front element focusing compact triplet lenses is always positive, that is, a convex surface. This is the general case for fixed front element lenses, too; but, as seen from Example G, it is not absolute. The actual radius depends on the solution of simultaneous conditions, being dependent on barrel length, refractive index, air spaces and the like. Experience shows that for most systems according to the invention a radius shorter than 0.14F leads to excessive spherical aberration, and unsymmetrical aberrations. A radius longer than 0.5F has too little lens power, too large a Petzval sum, P, and excessive astigmatism in the context of a triplet lens construction, particularly if the lens barrel is to be kept short. In front element focusing designs, if the radius is too long, the first element, lens I, is either too bi-convex or too weak in optical power. If weak in optical power, front element focusing requires excessive movement which, in turn, increases variations of lateral chromatism, distortion, and astigmatism. Too short a radius, $R_1$, on the first surface and the lens is too strong in optical power. Serious oblique aberrations are thereby introduced. These are exacerbated by front element focusing. Alternatively, if the $R_1$ is too short but the lens power appropriate, lens element I is more of a positive meniscus than acceptable front element focusing over an extended range, according to this invention, allows. Preferably, this first radius should lie in a range from 0.50F to 0.14F.

Where front element focusing is employed, studies indicate that the second surface, $R_2$, is always nearly flat or indeed strictly flat by design. That is to say, optimum front element focusing over an extended range appears to require that surface $R_2$ have a long radius, whether positive or negative. If this second surface is either too convex or too concave, extended range front element focusing introduces excessive variation in the astigmatic coefficient. Either the focusing range must be decreased or else the concavity or convexity of surface $R_2$ must be restricted. $R_2$ is concave for compact triplets with very short overall lengths and high refractive index glasses. It follows that element I is meniscus lens. The desirable range of $R_2$ lies between 0.40F and infinity without regard to algebraic sign or between 0.40F through infinity to −1.000F. The additional requirement of front element focusing usually means that the surface must be approximately plano. Studies have shown that radius $R_2$ should preferably be of an absolute value numerically greater than 2.00F, whether concave or convex for triplet lenses using front element displacement for focus control. For fixed front element designs, its absolute value can be in a range from 0.40F through infinity to −1.00F.

Third surface, $R_3$, is concave in all moving front element designs and most fixed element designs. It has an aspheric curvature which is used to correct certain spherical aberrations. Fourth surface, $R_4$, is also concave and is usually aspheric in species using front element focusing.

Surface $R_3$ is usually concave and more weakly so than surface $R_4$ as a rule. In short barrel triplets the actual surface will generally be figured aspherically, being concave in the axial region and rather less so at the outer zones. That is, a strong concave spherical third surface tends to cause too much inward coma and too much over-corrected spherical aberration unless asphericity is introduced or unless the barrel is lengthened. Experience has shown that the vertex radius should lie between −0.18F and −∞. If the radius is less concave than −1.00F, a short barrel could not be achieved or else a very unsymmetrical design results having unfavorable oblique aberrations unless extremely high refractive indices are used, such as diamond, $n_d = 2.42$, e.g., Example J.

Surface $R_4$ is often the strongest curvature of the optical system. It is always a concave surface. Much of the field-flattening contribution comes from this fourth surface, $R_4$. Its radius of curvature, in practice, seems to lie between 0.14F and 0.35F. If shorter than 0.14F, the optical system has excessive overcorrected spherical aberration and very large oblique aberrations, particularly with respect to oblique spherical aberration of the fifth order. If longer than 0.35F, Petzval sum, P, is too large for an acceptable photographic optical system.

In almost all triplet objective lenses according to this invention, fifth surface, $R_5$, is usually weakly concave, but occasionally weakly convex. Its concavity depends upon the refractive index and power of the rear element, lens III. In very short barrel length triplet lenses, the surface is usually concave. The actual range depends also on the refractive indices chosen for lens III. If surface $R_5$ is convex, rear lens III would either be too strong optically or its sixth surface, $R_6$, would be too weakly curved, excessive undercorrected astigmatism results. If too cncave, then distortion becomes excessive, or the system becomes quite unsymmetrical or else too much burden is thrust on the sixth surface, $R_6$. Accordingly, a reasonable range for surface $R_5$ is a radius in the range between 0.80F through infinity to −0.80F.

The last surface, $R_6$, is always strongly convex. Much of the correcting power of the system comes from this surface, leading to the desired net power, with correction for spherical aberration, coma and astigmatism. If its radius is too short, strongly under-corrected spherical aberration results; too long, and either the element is too weak optically to attain adequate field flatness, correction for astigmatism, and general symmetry of the triplet lens or the fifth radius, $R_5$, becomes too convex, with the consequences depicted above. According to this invention, then, this radius should lie in the range from −0.16F to −0.60F depending on the choice of refractive index for lens III.

As a general rule in compact triplet lenses, the outer lenses, I and III, should have high refractive indices and the inner element, lens II, should have a relatively low index.

For correction of aberrations it is more desirable to have very high-medium-very high refractive indices. An extreme example would be to use outer lenses of diamond and an inner lens of potassium iodide. Generally, though, extremely high refractive index materials may not have sufficient transparency in the violet portion of the spectrum or may be subject to atmospheric attack or may be commercially uneconomical. High indices for the outer elements permit shallower curvatures, i.e., larger radii, with improved corrections for aberrations. High index glasses are particularly useful in reducing field curvature without using excessively short radii in the system. Low indices for the central element are in general favorable but a mixed blessing. A low index glass in the negative element assists in reducing field curvature but results in sharper curvatures, that is, shorter radii at surfaces $R_3$ and $R_4$. Gains outweigh losses, however. If outer elements, lenses I and III, are made with very high refractive indices and the middle element, lens II, with an intermediate refractive index, then all advantages can be had more or less at once. There is no true limit on this arrangement numerically, but in practice available glass types must be used with consideration for the practical matters outlined above.

A teaching of this invention is that the refractive index of the first element should be at least $n_d = 1.58$ for compact systems to be used at $f/8$ and having focusing front elements. If lens speed is reduced to $f/11$, then this refractive index limit can be reduced to $n_d = 1.55$. There is no practical upper limit, excepting availability of glasses and other optical materials. The refractive index for the middle element should generally be low, but it depends on the refractive index choice for lens I. According to this invention, a lower bound of $n_d = 1.50$ and an upper bound of $n_d = 1.92$ for lens element II is required. Use of the latter index is dependent on use of an extremely high refractive index in the first element, lens I. The lower bound, $n_d = 1.50$, is set by current availability of practical optical materials. Absolute optimum performance does not seem to require the very lowest refractive index because surface curvatures $R_3$ and $R_4$ become too sharp. Vertex radii for those aspheric surfaces begin to fall outside limits previously discussed. Incorporation of aspheric curvatures onto the surfaces of negative lens element II makes it desirable to use plastic optical materials therein whenever practical. This is particularly true if large numbers are to be produced, in which case the aspheric shapes need only be produced on mold surfaces and multiple aspheric lens copies can be produced readily. A transparent plastic material particularly well suited for use in making lens II is sold by Rohm and Haas, Philadelphia, Pennsylvania, under the trademark Plexiglas H.

The refractive index of the last element, lens III, according to this invention should, in general, be approximately equal to or higher than that for the first element as shown in the examples.

The preceding statements, regarding the selection of high and medium refractive indices for the various elements, may be summarized by expressing the relative refractivity of the several elements as a percentage of the refractivity of one of them. Refractivity means the difference between the refractive index of the element and air (i.e., $n-1$). Relative refractivity as used here means the difference in refractive index between adjacent elements. Compact triplet lenses according to the teachings set forth herein will have their refractive indices selected so the absolute value of the sum of the algebraic differences in refractive index between adjacent elements (total relative refractivity) equals or exceeds thirty-five percent (35 percent) of the central component's refractivity. The mathematical expression of this, reduced to lowest terms, is:

$$|(n_1-n_2) + (n_3-n_2)| \geq 0.35(n_2-1)$$

In the preceding expression, the numerical value is used because it is the magnitude of the discontinuity in refractive indices that is important, not the sign. Refractive index sequences of high-medium-high for plus-minus-plus triplets and medium-high-medium for minus-plus-minus triplets are illustrated in the examples and the foregoing inequality applies in both situations regardless of the sequence.

Ranges of Abbe values, $\nu$, have also been determined for this invention. Clearly, if all glasses had infinite $\nu$ there would be no need for color correction. There would be no need for even calculating the lenses at other than a mean wavelength. In practicable systems, however, the design must begin either at the upper bound of $\nu$ for existing glass types for the outer elements or at the lower $\nu$ bound of existing glass types for the central element. One could extend the range of Abbe values by special design, e.g., the use of a cemented doublet to construct a component having a synthetic Abbe value or relaxation of one or more design conditions. For both lenses I and III the Abbe value can and should lie above 40. In the front element focusing species of this invention, it is preferable that the Abbe value of lens element I be at least 53. In general those systems having front and rear elements with $\nu$ nearer 70 have markedly less color aberration residuals than those near the low bound. The choice of refractive index $n_d$ also influences the choice of Abbe value, $\nu$. For Abbe $\nu$ values we must take materials as they are, rather than what is most desirable. For the refractive index, $n_d = 1.58$, $\nu$-values as large as 70 are available. Using higher refractive indices generally requires a compromise, that is, to accept a lower $\nu$ value. Materials having a refractive index of 2.60 and a $\nu$ value about 30 are available. Thus, the maximum range of $\nu$-values for the lens I and lens III can be from 70 to 30, but $\nu = 40$ is preferable as the low bound. The middle element, lens II, must always have somewhat more dispersive materials in a practicable system, resulting in a $\nu$-value range from 55 to 20, the latter being associated with potassium iodide. Generally, the most practicable materials for the first and third lens elements have refractive indices in the vicinity of $n_d = 1.70$ and Abbe $\nu$-values about 55.

The preferred systems have $\nu$ in the neighborhood of 55 for lens element I and 50 or higher for lens element III using the medium high refractive indices now available in association with such Abbe values. The Abbe value of the front lens, element I, in front element focusing designs, should be at least 20 percent greater than Abbe value of lens element II.

Contemplated within the scope of the inventive compact triplet photographic objective lens described herein is the use of compound lenses, e.g., achromatic doublets. These might be substituted for one or more of the three components of the triplet whereby the compound lens behaves optically as a single element component having desirable refractive index and Abbe value (reciprocal dispersive power) properties unobtainable from available optical materials. For example, a combination of two lens elements is contemplated wherein the pair, together, act as would a single component made from an optical material having a refractive index greater than 1.70 and an Abbe value substantially greater than 55. It is also within the scope of this invention to mold or bond thin plastic wafers to one or more surfaces of the objective. Desirable aspheric curvatures can be molded on plastic wafers more readily than they can be formed on hard glass surfaces. Plastic wafers might also be used to achieve desirable reciprocal dispersive powers in some sort of a form compound achromatic lens wherein advantage is taken of the plastic's Abbe $\nu$ value.

ASPHERIC SURFACES

The goal of optical design is to simplify a complicated optical system so a mathematical model of it behaves like an idealized simple lens system of the same focal length aperture and focus. Aberrations of higher order are eliminated or rendered harmless. Only low order basic properties remain. As aperture size increases, image quality deteriorates very rapidly in a simple imaging system. Higher order aberration terms cause this deterioration. They can be rendered negligible in a lens system by using design variables inherent in numerous surfaces and glass types, etc., to control extra-axial light rays and bundles of rays. If aberrations are not too severe and several elements are included in the lens system, sufficient parameters are available so only spherical surfaces need be used. Usually there are enough parameters and space in a lens of normal design to permit elimination or substantial reduction of harmful aberrations. When they are severe, a common solution is to add more elements thereby providing extra parameters for further correction of residual aberrations. Often a limit is reached, or exists, on the number of elements which can be used in the available space. Frequently, correction of residual aberrations is a problem only in a particular section of the lens where specific corrections must be made. In this situation, an aspheric surface is more useful. An aspheric correction has the highly desirable feature that it gets directly to the cause of the trouble. It leads to controlled refraction in a very small space. An aspheric does not add to the transmission losses and generally does not complicate space requirements within the lens barrel.

An aspheric surface introduces needed extra parameters, which can be used to correct far more aberrations. They measurably improve optical performance in the outer image field.

Often if additional spheric surfaces are introduced to reduce a bad aberration, rather strong curvatures must be used before the difference in successive refractions can be put to work on a particular residual aberration. Strong curvatures introduce new troubles of other types. An aspheric surface on the appropriate lens surface avoids this by changing localized refractions without drastically upsetting the design at other points in the lens system.

The aspheric formula used in the design of the triplet photographic objective lens of this invention is:

$$\xi = \frac{c\rho^2}{1+\sqrt{1-c^2\rho^2}} + \beta\rho^4 + \gamma\rho^6$$

It describes a surface of revolution in terms of its height $\xi$ above a plano reference surface at a distance $\rho$ from the axis of revolution. The axis of revolution is coaxial with the optic axis. Surface curvature at the vertex is expressed by $c$. It is the reciprocal of the vertex radius, $1/R$. Coefficients defining the aspheric curvature are $\beta$ and $\gamma$. Their values are determined by the intended effect of the aspheric surface on off-axis light rays.

In light of the foregoing discussion, it should be understood that specific lens designs discussed above in explicit detail are just examples of the invention. Since changes may be made in compact photographic triplet lens described above without departing from the scope of the invention herein involved, it is intended that all matter contained in the above description or shown in the accompanying drawing shall be interpreted as illustrative of the broad principles of this invention and not necessarily as limiting on its scope.

What is claimed is:

1. A compact photographic objective lens consisting of three axially aligned air-spaced components having an overall length, from the entrance surface to the exit surface, less than one-eighth of its nominal focal length, said components arranged in the following order from the long conjugate side to the short conjugate side of said objective; a convergent first component having a convex surface toward said long conjugate; a biconcave divergent second component; and a convergent third component having a convex surface toward said short conjugate, said first component having an Abbe $\nu$ value at least 20 percent greater than the Abbe $\nu$ value of said second component, the Petzval sum of said objective not exceeding 0.300.

2. A compact photographic objective lens comprising three axially aligned air-spaced components having an overall length, from the entrance surface to the exit surface, less than one-eighth of its nominal focal length, said components arranged in the following order from the long conjugate side to the short conjugate side of said objective; a convergent first component having a convex surface toward said long conjugate; a biconcave civergent second component; and a convergent third component having a convex surface toward said short conjugate, said components having refractive indices selected so the absolute value of the sum of the algebraic differences in refractive index between adjacent components exceeds 35 percent of the central component's refractivity and said first component having an Abbe $\nu$ value at least 20 percent greater than the Abbe $\nu$ value of said second component, the Petzval sum of said objective not exceeding 0.300.

3. The compact photographic objective lens described in claim 2 further comprising at least one aspherically curved surface for correcting spherical aberrations of said lens.

4. The compact photographic objective lens described in claim 3 wherein said first component is moved to accomplish focusing and having an aperture with a diameter greater than one-sixteenth of said lens' nominal focal length.

5. The compact photographic objective lens described in claim 4, wherein said first component has a power at least three times the power of said lens.

6. A compact photographic objective lens comprising axially aligned front, middle, and rear elements having an overall length, from the entrance surface to the exit surface, less than one-eighth of its nominal focal length, said elements having refractive indices selected so the absolute value of the sum of the algebraic differences in refractive index between adjacent elements exceeds 35 percent of the central element's refractivity and having surface curvatures and refractive indices preselected so the summation $$\frac{N_I-1}{N_I}\left(\frac{1}{R_1}-\frac{1}{R_2}\right)+\frac{N_{II}-1}{N_{II}}\left(\frac{1}{R_3}-\frac{1}{R_4}\right)+\frac{N_{III}-1}{N_{III}}\left(\frac{1}{R_5}-\frac{1}{R_6}\right)$$

does not exceed 0.300, where $N_I$, $N_{II}$, $N_{III}$ represent the refractive indices of said front, middle and rear elements respectively; and $R_1$, $R_2$, $R_3$, $R_4$, $R_5$, $R_6$ represent vertex radii of successive refractive surfaces from front to rear.

7. The compact photographic objective lens of claim 1 wherein said front, middle, and rear components each comprise single optical lens elements.

8. The compact photographic objective lens of claim 6 wherein said three axially aligned elements are air-spaced and arranged in the following order from the long conjugate side to the short conjugate side of said compact objective and comprising:
- a convergent first element having a convex surface toward said long conjugate;
- a bi-concave divergent second element; and
- a convergent third element having a convex surface toward said short conjugate.

9. The compact photographic objective lens of claim 6 further characterized in that at least one surface is aspheric.

10. The compact photographic objective lens of claim 6 wherein said first element is moved to accomplish focusing.

11. The compact photographic objective lens of claim 10 further characterized in that two surfaces of said divergent second element are aspheric and can be mathematically described by a polynomial equation having at least the following terms:

$$\xi = \frac{c\rho^2}{1+\sqrt{1-c^2\rho^2}} + \beta\rho^4 + \gamma\rho^6$$

wherein $\xi$ represents the aspheric surface's height above a reference surface; $c$ is the reciprocal of the vertex radius; $\rho$ is the distance from the axis; $\beta$ and $\gamma$ are constants having values preselected to optimize said aspheric surface's effect on off-axis light rays.

12. The compact photographic objective lens of claim 10 wherein the Abbe value of said convergent first element is at least 20 percent greater than the Abbe value of said divergent second element.

13. A compact photographic objective lens comprising three axially aligned components having an overall length, from the entrance surface to the exit surface, less than one-eighth of its nominal focal length, said components having refractive indices selected so the absolute value of the sum of the algebraic differences in refractive index between adjacent components exceeds 35 percent of the central component's refractivity and a Petzval sum not exceeding 0.300.

14. The compact photographic objective lens of claim 13 wherein said three axially aligned components are air-spaced single elements arranged in the following order from the long conjugate side to the short conjugate side of said compact objective and comprising:
- a convergent first element having a convex surface toward said long conjugate;
- a bi-concave divergent second element; and
- a convergent third element having a convex surface toward said short conjugate.

15. The compact photographic objective lens of claim 14 further characterized in that at least one surface has an aspheric curvature to correct spherical aberration.

16. The compact photographic objective lens of claim 15 further characterized in that two surfaces of said divergent second element are aspheric and can be mathematically described by a polynomial equation having at least the following terms:

$$\xi = \frac{c\rho^2}{1+\sqrt{1-c^2\rho^2}} + \beta\rho^4 + \gamma\rho^6$$

wherein $\xi$ represents the aspheric surface's height above a reference surface; $c$ is the reciprocal of the vertex radius; $\rho$ is the distance from the axis; $\beta$ and $\gamma$ are constants having values preselected to optimize said aspheric surface's effect on off-axis light rays.

17. The compact photographic objective lens of claim 14 wherein said first element is moved to accomplish focusing.

18. The compact photographic objective lens of claim 17 wherein the Abbe value of said convergent first element is at least 20 percent greater than the Abbe value of said divergent second element.

19. The compact photographic objective lens described in claim 17 wherein said first element has a power at least three times the power of said objective lens.

20. The compact photographic objective lens of claim 14 wherein the refractive index of said first and said third element is greater than 1.55, and the refractive index of said second element is less than 1.70.

21. The compact photographic objective lens of claim 20 wherein the Abbe $\nu$ value of each of said first and said third elements exceeds 40 and the Abbe $\nu$ value of said second element ranges from 20 to 55, said Abbe $\nu$ value of said first element being at least 20 percent greater than said Abbe $\nu$ value of said second element.

22. The compact photographic objective lens of claim 21 where the vertex radius of the first refractive surface lies in the range 0.14F to 0.50F, the vertex radius of the second refractive surface lies in the range −1.00F through infinity to 0.40F, the vertex radius of the third refractive surface lies in the range −0.18F to −∞, the vertex radius of the fourth refractive surface lies in the range 0.14F to 0.35F, the vertex radius of the fifth refractive surface lies in the range −0.80F through infinity to 0.80F, and the vertex radius of the sixth refractive surface lies in the range −0.60F to −0.16F.

23. The compact photographic objective lens of claim 21 having vertex radii within the following limits:

$$\begin{array}{c} 0.14F \leq R_1 \leq 0.50F \\ \left[\begin{array}{c} =\infty \leq R_2 \leq -1.00F \quad \text{or} \\ 0.04F \leq R_2 \leq \infty \end{array}\right] \\ -\infty \leq R_3 \leq -0.18F \\ 0.14F \leq R_4 \leq 0.35F \\ 0.80F \leq R_5 \leq \infty \\ -0.60F \leq R_6 \leq -0.16F \end{array}$$

wherein $R_1$, $R_2$, etc., represent the refractive surfaces in order from long conjugate side to short conjugate side and the radii are expressed in terms of said objective's focal length, F; R indicates the absolute numerical value without regard to sign.

24. A compact photographic lens comprising three axially aligned air-spaced elements arranged in the following order from the long conjugate side to the short conjugate side of said objective lens: a convergent first element having a convex surface toward said long conjugate, a bi-concave divergent second element, and a convergent third element having a convex surface toward said short conjugate, said compact objective lens having an overall length, from the entrance surface to the exit surface, less than one-eighth of its nominal focal length and a Petzval sum not exceeding 0.300, and:

said first element having a refractive index greater than 1.55, and an Abbe $\nu$ value both greater than 40 and at least 1.2 times the Abbe $\nu$ value of said second element, a front vertex radius $R_1$ in the range from 0.14F to 0.50F, and a rear vertex radius $R_2$ in the range from −1.00F through infinity to 0.40F;

said second element having a refractive index less than 1.70, an Abbe $\nu$ value in the range 20 to 55, a front vertex radius $R_3$ in the range from −0.18F to −∞, and a rear vertex radius $R_4$ in the range from 0.14F to 0.35F;

said third element having a refractive index greater than 1.55, an Abbe $\nu$ value greater than 40, a front vertex radius $R_5$ in the range from −0.80F through infinity to 0.80F, and a rear vertex radius $R_6$ in the range from −0.60F to −0.16F, said refractive indices selected so the numerical differences in refractive index between adjacent elements exceeds 35 percent of the second element's refractivity; and wherein refractive indices are specified for a light wavelength of 587.6 nanometers and $R_1$, $R_2$, $R_3$, $R_4$, $R_5$, $R_6$ represent vertex radii of curvature of their respective refractive surfaces from said objective's long conjugate side to its short conjugate side.

25. A compact, three element photographic objective lens having the design parameters for unit focal length, F, represented in the following table:

| F = 1.000 | | L.O.A. = 0.696 | | | f/8.6 |
|---|---|---|---|---|---|
| LENS | $n_d$ | $\nu_d$ | Radii | | Thicknesses |
| I | 1.678 | 55.2 | $R_1 = 0.1823$ | | $t_1 = 0.0153$ |
| | | | $R_2 = $ plano | | $s_1 = 0.0137$ |
| II | 1.519 | 44.4 | $R_3 = -0.2585$ | | $t_2 = 0.0065$ |
| | | | $R_4 = 0.1624$ | | $s_2 = 0.0199$ |
| III | 1.615 | 51.2 | $R_5 = -2.578$ | | $t_3 = 0.0142$ |
| | | | $R_6 = -0.2496$ | | $s_3 = 0.9708$ | wherein Roman numerals identify lens elements in order from front to rear; $n_d$ is the refractive index for a light wavelength of 587.6 nanometers; $\nu_d$ is Abbe's ratio; $R_1$, $R_2$, $R_5$ and $R_6$ represent radii of successive refractive surfaces from front to rear; t and s represent thicknesses of lens elements and air spaces, respectively, from front to rear, [$s_1$ being variable]; $R_3$ represents the vertex radius of an aspheric surface contoured according to the formula:

$$\xi = \frac{c\rho^2}{1+\sqrt{1-c^2\rho^2}} + 20.150\rho^4 + 766.4\rho^6$$

and $R_4$ represents the vertex radius of an aspheric surface contoured according to the formula:

$$\xi = \frac{c\rho^2}{1+\sqrt{1-c^2\rho^2}} - 20.833\rho^4 + 929.8\rho^6$$

$\xi$ being the aspheric surface height from a plano reference surface, $\rho$ the radial distance from the lens axis, and c the reciprocal of the vertex radius.

26. A compact, three element photographic objective lens having the design parameters for unit focal length, F, represented in the following table:

| F = 1.000 | | L.O.A. = 0.0614 | | f/8.6 |
|---|---|---|---|---|
| LENS | $n_d$ | $\nu_d$ | RADII | THICKNESSES |
| I | 1.678 | 55.2 | $R_1 = 0.1915$ | $t_1 = 0.0141$ |
| | | | $R_2 = -7.632$ | $s_1 = 0.0106$ |
| II | 1.519 | 44.4 | $R_3 = -0.2189$ | $t_2 = 0.0067$ |
| | | | $R_4 = 0.1795$ | $s_2 = 0.0168$ |
| III | 1.611 | 55.9 | $R_5 = -1.0021$ | $t_3 = 0.0132$ |
| | | | $R_6 = -0.2021$ | $s_3 = 0.9946$ | wherein Roman numerals identify lens elements in order from front to rear; $n_d$ is the refractive index for a light wavelength of 587.6 nanometers; $\nu_d$ is Abbe's ratio; $R_1$, $R_2$, $R_5$ and $R_6$ represent radii of successive refractive surfaces from front to rear; t and s represent thicknesses of lens elements and air spaces respectively, from front to rear, [$s_1$ being variable]; $R_3$ represents the vertex radius of an aspheric surface contoured according to the formula:

$$\xi = \frac{c\rho^2}{1+\sqrt{1-c^2\rho^2}} + 20.227\rho^4 + 670.7\rho^6$$

and $R_4$ represents the vertex radius of an aspheric surface contoured according to the formula:

$$\xi = \frac{c\rho^2}{1+\sqrt{1-c^2\rho^2}} - 22.134\rho^4 + 498.2\rho^6$$

$\xi$ being the aspheric surface height from a plano reference surface, $\rho$ the radial distance from the lens axis, and c the reciprocal of the vertex radius.

27. A compact, three element photographic objective lens having the design parameters for unit focal length, F, represented in the following table:

| F = 1.000 | | L.O.A. = 0.120 | | f/8.6 |
|---|---|---|---|---|
| LENS | $n_d$ | $\nu_d$ | RADII | THICKNESSES |
| I | 1.836 | 42.3 | $R_1$ 0.2568 | $t_1$ -0.0200 |
| | | | $R_2$ 0.6078 | $s_1 = 0.0341$ |
| II | 1.617 | 31.0 | $R_3$ 0.5648 | $t_2 = 0.0100$ |
| | | | $R_4$ 0.2938 | $s_2 = 0.0359$ |
| III | 1.836 | 42.3 | $R_5$ -14.63 | $t_3 = 0.0200$ |
| | | | $R_6$ -0.3959 | $s_3 = 0.937$ | wherein Roman numerals identify lens elements in order from front to rear; $n_d$ is the refractive index for a light wavelength of 587.6 nanometers; $\nu_d$ is Abbe's ratio; $R_1$, $R_2$, $R_4$, $R_5$, and $R_6$ represent radii of successive refractive surfaces from front to rear; t and s represent thicknesses of lens elements and air spaces respectively, from front to rear; $R_3$ represents the vertex radius of an aspheric surface contoured according to the formula:

$$\xi = \frac{c\rho^2}{1+\sqrt{1-c^2\rho^2}} + 3.590\rho^4$$

$\xi$ being the aspheric surface height from a plano reference surface, $\rho$ the radial distance from the lens axis, and c the reciprocal of the vertex radius.

28. A compact, three element photographic objective lens having the design parameters for unit focal length, F, represented in the following table:

| F = 1.000 | | L.O.A. = 0.120 | | |
|---|---|---|---|---|
| LENS | $n_d$ | $\nu_d$ | RADII | THICKNESSES |

| I | 1.729 | 54.2 | $R_1 = 0.2538$ | $t_1 = 0.0200$ |
|---|---|---|---|---|
|   |   |   | $R_2 = 2.430$ | $s_1 = 0.0302$ |
| II | 1.596 | 39.2 | $R_3 = -0.3871$ | $t_2 = 0.0100$ |
|   | $R_4 = 0.2555$ |   |   | $s_2 = 0.0398$ |
| III | 1.788 | 50.5 | $R_5 = -2.283$ | $t_3 = 0.0200$ |
|   |   |   | $R_6 = -0.3395$ | $s_3 = 0.9276$ | wherein Roman numerals identify lens elements in order from front to rear; $n_d$ is the refractive index for a light wavelength of 587.6 nanometers; $\nu_d$ is Abbe's ratio; $R_1$, $R_2$, $R_4$, $R_5$, and $R_6$ represent radii of successive refractive surfaces from front to rear; t and s represent thicknesses of lens elements and air spaces, respectively, from front to rear; $R_3$ represents the vertex radius of an aspheric surface contoured according to the formula:

$$\xi = \frac{c\rho^2}{1+\sqrt{1-c^2\rho^2}} + 10.323\rho^4$$

$\xi$ being the aspheric surface height from a plano reference surface, $\rho$ the radial distance from the lens axis, and c the reciprocal of the vertex radius.

29. A compact, three element photographic objective lens having the design parameters for unit focal length, F, represented in the following table:

| F = 1.000 | | L.O.A. = 0.120 | | f/8.6 |
|---|---|---|---|---|
| LENS | $n_d$ | $\nu_d$ | Radii | Thicknesses |
| I | 1.802 | 44.3 | $R_1 = 0.2583$ | $t_1 = 0.0200$ |
|   |   |   | $R_2 = 0.5146$ | $s_1 = 0.0420$ |
| II | 1.617 | 31.0 | $R_3 = -0.4750$ | $t_2 = 0.0100$ |
|   |   |   | $R_4 = 0.3389$ | $s_2 = 0.0280$ |
| III | 1.881 | 41.0 | $R_5 = 21.42$ | $t_3 = 0.0200$ |
|   |   |   | $R_6 = -0.3848$ | $s_3 = 0.9412$ | wherein Roman numerals identify lens elements in order from front to rear; $n_d$ is the refractive index for a light wavelength of 587.6 nanometers; $\nu_d$ is Abbe's ratio; $R_1$, $R_2$, $R_4$, $R_5$ and $R_6$ represent radii of successive refractive surfaces from front to rear; t and s represent thicknesses of lens elements and air spaces, respectively, from front to rear; $R_3$ represents the vertex radius of an aspheric surface contoured according to the formula:

$$\xi = \frac{c\rho^2}{1+\sqrt{1-c^2\rho^2}} + 2.512\rho^4$$

$\xi$ being the aspheric surface height from a plano reference surface, $\rho$ the radial distance from the lens axis, and c the reciprocal of the vertex radius.

30. A compact, three element photographic objective lens having the design parameters for unit focal length, F, represented in the following table:

| F = 1.000 | | L.O.A. = 0.089 | | f/8.6 |
|---|---|---|---|---|
| LENS | $n_d$ | $\nu_d$ | Radii | Thicknesses |
| I | 1.613 | 57.4 | $R_1 = 0.1775$ | $t_1 = 0.0213$ |
|   |   |   | $R_2 = 2.027$ | $s_1 = 0.0139$ |
| II | 1.519 | 44.4 | $R_3 = -0.2928$ | $t_2 = 0.0091$ |
|   |   |   | $R_4 = 0.1605$ | $s_2 = 0.0264$ |
| III | 1.697 | 56.2 | $R_5 = 1.490$ | $t_3 = 0.0183$ |
|   |   |   | $R_6 = -0.3379$ | $s_3 = 0.9619$ | wherein Roman numerals identify lens elements in order from front to rear; $n_d$ is the refractive index for a light wavelength of 587.6 nanometers; $\nu_d$ is Abbe's ratio; $R_1$, $R_2$, $R_5$, and $R_6$ represent radii of successive refractive surfaces from front to rear; $t$ and s represent thicknesses of lens elements and air spaces, respectively, from front to rear, [$s_1$ being variable]; $R_3$ represents the vertex radius of an aspheric surface contoured according to the formula:

$$\xi = \frac{c\rho^2}{1+\sqrt{1-c^2\rho^2}} + 23.444\rho^4 + 600.4\rho^6$$

and $R_4$ represents the vertex radius of an aspheric surface contoured according to the formula:

$$\xi = \frac{c\rho^2}{1+\sqrt{1-c^2\rho^2}} - 14.178\rho^4 + 556.7\rho^6$$

$\xi$ being the aspheric surface height from a plano reference surface, $\rho$ the radial distance from the lens axis, and c the reciprocal of the vertex radius.

31. A compact, three element photographic objective lens having the design parameters for unit focal length, F, represented in the following table:

| F = 1.000 | | L.O.A. = 0.0729 | | P = 0.028 | f/8.6 |
|---|---|---|---|---|---|
| LENS | $n_d$ | $\nu_d$ | | Radii | Thicknesses |
| I | 1.519 | 44.4 | | $R_1 = -0.2635$ | $t_1 = 0.0080$ |
|   |   |   | | $R_2 = -6.7715$ | $s_1 = 0.0169$ |
| II | 1.678 | 55.2 | | $R_3 = 0.1890$ | $t_2 = 0.0329$ |
|   |   |   | | $R_4 = -0.2386$ | $s_2 = 0.0071$ |
| III | 1.519 | 44.4 | | $R_5 = -0.5510$ | $t_3 = 0.0080$ |
|   |   |   | | $R_6 = 0.1775$ | $s_3 = 1.0624$ | wherein Roman numerals identify lens elements in order from front to rear; $n_d$ is the refractive index for a light wavelength of 587.6 nanometers; $\nu_d$ is Abbe's ratio; $R_1$, $R_2$, $R_5$, and $R_6$ represent radii of successive refractive surfaces from front to rear; $t$ and s represent thicknesses of lens elements and air spaces, respectively, from front to rear, [$s_1$ being variable]; $R_3$ represents the vertex radius of an aspheric surface contoured according to the formula:

$$\xi = \frac{c\rho^2}{1+\sqrt{1-c^2\rho^2}} - 29.705\rho^4$$

and $R_4$ represents the vertex radius of an aspheric surface contoured according to the formula:

$$\xi = \frac{c\rho^2}{1+\sqrt{1-c^2\rho^2}} + 24.034\rho^6$$

$\xi$ being the aspheric surface height from a plano reference surface, $\rho$ the radial distance from the lens axis, and c the reciprocal of the vertex radius.

32. A compact, three element photographic objective lens having the design parameters for unit focal length, F, represented in the following table:

| F = 1.000 | | L.O.A. = 0.0683 | | f/8.6 |
|---|---|---|---|---|
| LENS | $n_d$ | $\nu_d$ | Radii | Thicknesses |
| I | 1.678 | 55.2 | $R_1 = 0.1828$ | $t_1 = 0.0153$ |
|   |   |   | $R_2 = $ plano | $s_1 = 0.0133$ |
| II | 1.519 | 44.4 | $R_3 = -0.2549$ | $t_2 = 0.0065$ |
|   |   |   | $R_4 = 0.1634$ | $s_2 = 0.0189$ |
| III | 1.615 | 51.2 | $R_5 = -2.249$ | $t_3 = 0.0143$ |
|   |   |   | $R_6 = -0.2440$ | $s_3 = 0.9731$ | wherein Roman numerals identify lens elements in order from front to rear; $n_d$ is the refractive index for a light wavelength of 587.6 nanometers; $\nu_d$ is Abbe's ratio; $R_1$, $R_2$, $R_5$, and $R_6$ represent radii of successive refractive surfaces from front to rear; $t$ and s represent thicknesses of lens elements and air spaces, respectively, from front to rear, [$s_1$ being variable]; $R_3$ represents the vertex radius of an aspheric surface contoured according to the formula:

$$\xi = \frac{c\rho^2}{1+\sqrt{1-c^2\rho^2}} + 20.2299\rho^4 + 757.4\rho^6$$

and $R_4$ represents the vertex radius of an aspheric surface contoured according to the formula:

$$\xi = \frac{c\rho^2}{1+\sqrt{1-c^2\rho^2}} - 21.0009\rho^4 + 918.9\rho^6$$

$\xi$ being the aspheric surface height from a plano reference surface, $\rho$ the radial distance from the lens axis, and $c$ the reciprocal of the vertex radius.

33. A compact, three element photographic objective lens having the design parameters for unit focal length, F, represented in the following table:

| F = 1.000 | | L.O.A. = 0.1149 | | f/6.3 |
|---|---|---|---|---|
| LENS | $n_d$ | $\nu_d$ | Radii | Thicknesses |
| I | 2.4176 | 55.9 | $R_1 = 0.2467$ | $t_1 = 0.0137$ |
| | | | $R_2 = 0.3277$ | $s_1 = 0.0369$ |
| II | 1.9212 | 35.7 | $R_3 = 15.22$ | $t_2 = 0.0077$ |
| | | | $R_4 = 0.4119$ | $s_2 = 0.0449$ |
| III | 2.4176 | 55.9 | $R_5 = -0.8651$ | $t_3 = 0.0117$ |
| | | | $R_6 = -0.4530$ | $s_3 = 0.9308$ | wherein Roman numerals identify lens elements in order from front to rear; $n_d$ is the refractive index for a light wavelength of 587.6 nanometers; $\nu_d$ is Abbe's ratio; $R_1$, $R_2$, $R_4$, and $R_6$ represent radii of successive refractive surfaces from front to rear; $t$ and $s$ represent thicknesses of lens elements and air spaces, respectively, from front to rear; $R_3$ represents the vertex radius of an aspheric surface contoured according to the formula:

$$\xi = \frac{c\rho^2}{1+\sqrt{1-c^2\rho^2}} - 2.7011\rho^4$$

and $R_4$ represents the vertex radius of an aspheric surface contoured according to the formula:

$$\xi = \frac{c\rho^2}{1+\sqrt{1-c^2\rho^2}} + 1.2359\rho^6$$

$\xi$ being the aspheric surface height from a plano reference surface, $\rho$ the radial distance from the lens axis, and $c$ the reciprocal of the vertex radius.

34. A compact, three element photographic objective lens having the design parameters for unit focal length, F, represented in the following table:

| F = 1.000 | | L.O.A. = 0.1214 | | f/8.0 |
|---|---|---|---|---|
| LENS | $n_d$ | $\nu_d$ | Radii | Thicknesses |
| I | 1.641 | 60.1 | $R_1 = 0.2002$ | $t_1 = 0.0240$ |
| | | | $R_2 = 1.1883$ | $s_1 = 0.0235$ |
| II | 1.519 | 44.4 | $R_3 = -0.5478^*$ | $t_2 = 0.0075$ |
| | | | $R_4 = 0.1844^*$ | $s_2 = 0.0484$ |
| III | 1.583 | 59.5 | $R_5 = 1.4240$ | $t_3 = 0.0180$ |
| | | | $R_6 = -0.4219$ | $s_3 = 0.9133$ | wherein Roman numerals identify lens elements in order from front to rear; $n_d$ is the refractive index for a light wavelength of 587.6 nanometers; $\nu_d$ is Abbe's ratio; $R_1$, $R_2$, $R_4$, and $R_6$ represent radii of successive refractive surfaces from front to rear; $t$ and $s$ represent thicknesses of lens elements and air spaces, respectively, from front to rear; $R_3$ represents the vertex radius of an aspheric surface contoured according to the formula:

$$\xi = \frac{c\rho^2}{1+\sqrt{1-c^2\rho^2}} - 4.325\rho^4$$

and $R_4$ represents the vertex radius of an aspheric surface contoured according to the formula:

$$\xi = \frac{c\rho^2}{1+\sqrt{1-c^2\rho^2}} + -5.656\rho^6$$

$\xi$ being the aspheric surface height from a plano reference surface, $\rho$ the radial distance from the lens axis, and $c$ the reciprocal of the vertex radius.

* * * * *